United States Patent
Middleburgh et al.

(10) Patent No.: US 11,456,083 B2
(45) Date of Patent: Sep. 27, 2022

(54) NUCLEAR FUEL PELLET, A FUEL ROD, AND A FUEL ASSEMBLY

(71) Applicant: WESTINGHOUSE ELECTRIC SWEDEN AB, Västerås (SE)

(72) Inventors: Simon Middleburgh, Chester (GB); Mattias Puide, Västerås (SE)

(73) Assignee: Westinghouse Electric Sweden AB, Vasteras (SE)

( * ) Notice: Subject to any disclaimer, the term of this patent is extended or adjusted under 35 U.S.C. 154(b) by 394 days.

(21) Appl. No.: 16/611,328

(22) PCT Filed: Apr. 16, 2018

(86) PCT No.: PCT/EP2018/059653
§ 371 (c)(1),
(2) Date: Nov. 6, 2019

(87) PCT Pub. No.: WO2018/206234
PCT Pub. Date: Nov. 15, 2018

(65) Prior Publication Data
US 2020/0168351 A1    May 28, 2020

(30) Foreign Application Priority Data
May 12, 2017    (EP) ..................................... 17170860

(51) Int. Cl.
*G21C 3/64* (2006.01)
*G21C 3/04* (2006.01)
*G21C 3/62* (2006.01)

(52) U.S. Cl.
CPC ............ *G21C 3/64* (2013.01); *G21C 3/045* (2019.01); *G21C 3/62* (2013.01)

(58) Field of Classification Search
CPC .............. G21C 3/62; G21C 3/64; C22C 43/00
(Continued)

(56) References Cited

U.S. PATENT DOCUMENTS 2,990,274 A * 6/1961 Greenberg ............... G21C 3/60
376/901
3,089,768 A * 5/1963 Kittel ....................... G21C 3/60
148/560

(Continued)

FOREIGN PATENT DOCUMENTS

| CN | 103561893 A | 2/2014 |
| CN | 104628395 A | 5/2015 |

(Continued)

OTHER PUBLICATIONS

Office Action from corresponding Taiwanese Application No. 107105589, dated Feb. 4, 2021.

(Continued)

*Primary Examiner* — Jack W Keith
*Assistant Examiner* — Jinney Kil
(74) *Attorney, Agent, or Firm* — Murtha Cullina LLP

(57) ABSTRACT

A nuclear fuel pellet for a nuclear reactor is disclosed. The pellet comprises a metallic matrix and ceramic fuel particles of a fissile material dispersed in the metallic matrix. The metallic matrix is an alloy consisting of the principle elements U, Zr, Nb and Ti, and of possible rest elements. The concentration of each of the principle elements in the metallic matrix is at the most 50 molar-%.

11 Claims, 1 Drawing Sheet

(58) Field of Classification Search
USPC .......................................................... 376/421
See application file for complete search history.

(56) References Cited

U.S. PATENT DOCUMENTS

| | | | | |
|---|---|---|---|---|
| 3,096,263 | A * | 7/1963 | Kingston | ................. G21C 3/64 75/250 |
| 3,207,697 | A | 9/1965 | Friedrich et al. | |
| 3,236,921 | A * | 2/1966 | Sermon | .................... G21C 3/64 264/0.5 |
| 3,266,890 | A * | 8/1966 | Greenspan | .............. C22C 43/00 376/901 |
| 3,369,890 | A * | 2/1968 | Wilhelm | ................... C22C 1/02 976/DIG. 94 |
| 4,968,482 | A * | 11/1990 | Ludtka | .................... C22C 43/00 420/3 |
| 7,666,463 | B1 | 2/2010 | Youchison et al. | |
| 2014/0205054 | A1 | 7/2014 | Lee et al. | |
| 2014/0334595 | A1* | 11/2014 | Bashkirtsev | ............. G21C 3/06 376/412 |
| 2015/0294747 | A1 | 10/2015 | Walters | |
| 2016/0326616 | A1* | 11/2016 | Park | ........................ G21C 13/08 |
| 2018/0130562 | A1* | 5/2018 | Lordi | ...................... C22C 16/00 |

FOREIGN PATENT DOCUMENTS

| | | | |
|---|---|---|---|
| CN | 104956446 | A | 9/2015 |
| GB | 803118 | A * | 10/1958 |
| GB | 854096 | A * | 11/1960 |
| GB | 854808 | A * | 11/1960 |
| GB | 857009 | A * | 12/1960 |
| GB | 909481 | A * | 10/1962 |
| GB | 909481 | A | 10/1962 |
| TW | 240318 | B | 2/1995 |
| WO | 2008121513 | A2 | 10/2008 |
| WO | 2017019620 | A1 | 2/2017 |

OTHER PUBLICATIONS

International Search Report issued in corresponding PCT Application No. PCT/EP2018/059653, dated Jul. 9, 2018, pp. 1-2.

* cited by examiner

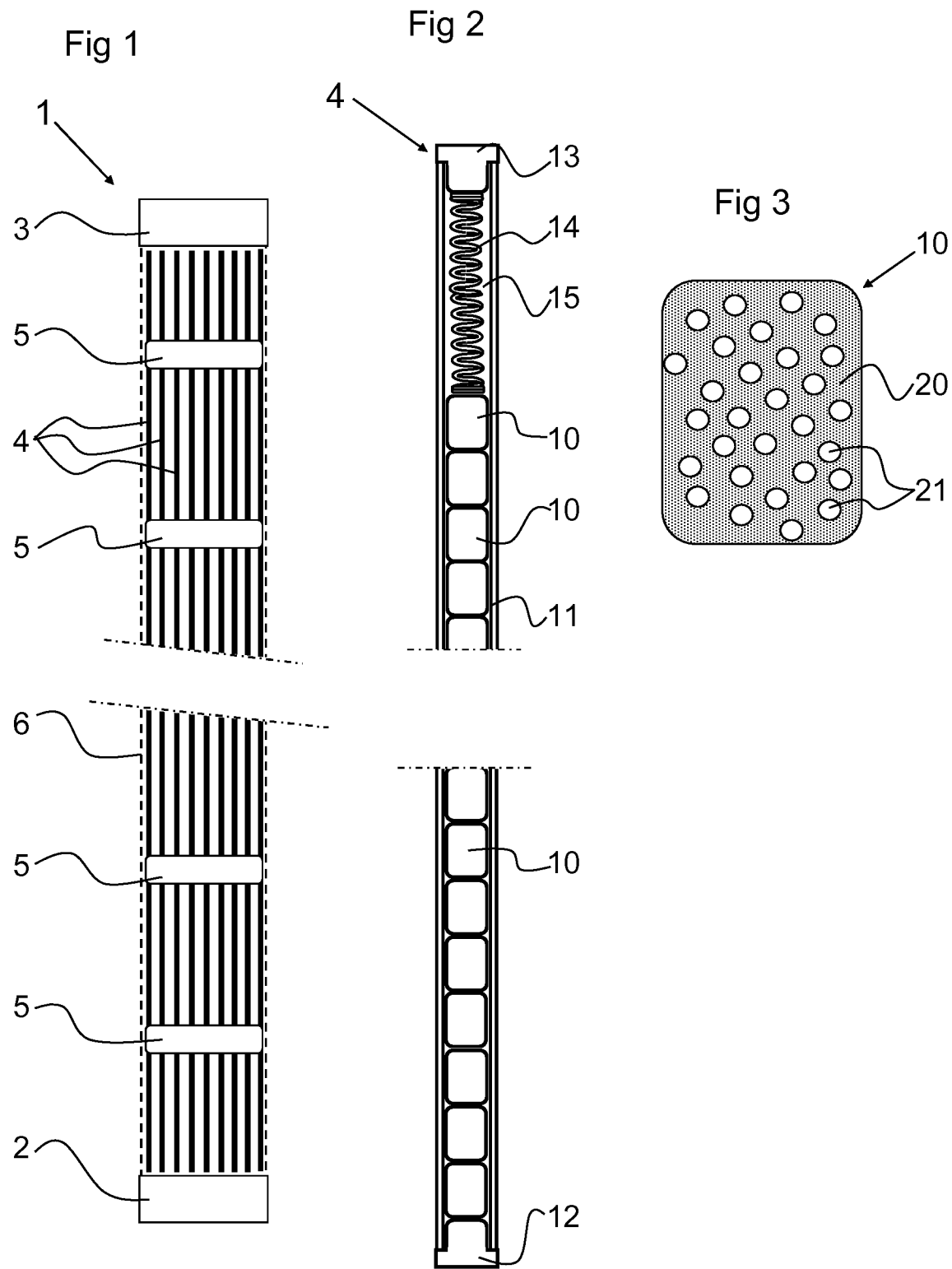

NUCLEAR FUEL PELLET, A FUEL ROD, AND A FUEL ASSEMBLY

TECHNICAL FIELD OF THE INVENTION

The present invention refers generally to a cermet matrix composition for nuclear fuel for use in in nuclear reactors, such as water reactors and fast reactors. More specifically, the present invention refers to a nuclear fuel pellet for a nuclear reactor, comprising a metallic matrix and ceramic fuel particles of a fissile material dispersed in the metallic matrix. The invention also refers to a fuel rod, and to a fuel assembly for use in a nuclear reactor.

BACKGROUND OF THE INVENTION AND PRIOR ART

Non-active metallic systems, such as Mo, have been suggested as compounds of the matrix to hold fissile material in nuclear fuel pellets. US 2015/0294747 discloses a method of fabricating a cermet metal fuel matrix fuel pin. The fuel pin may comprise ceramic particles of spent nuclear fuel, thorium oxide, americium oxide, and combinations of these in a metallic matrix from a feedstock. The metallic matrix may include uranium, zirconium, transuranics, molybdenum, reprocessed metal fuel.

SUMMARY OF THE INVENTION

An object of the present invention is to provide a new matrix material for cermet fuel, and a new ceramic-metallic dual phase fuel. In particular, it is aimed at an improved matrix permitting the nuclear fuel pellet to fulfil the requirements of so called accident tolerant fuels, ATF.

This object is achieved by the nuclear fuel pellet initially defined, which is characterized in that that the metallic matrix is an alloy consisting of the principle elements U, Zr, Nb and Ti, and of possible rest elements, wherein the concentration of each of the principle elements in the metallic matrix is at the most 50 molar-%.

Such a material of the metallic matrix comprising a four principle elements, and possibly a minor amount of rest elements, i.e. a so called balance, will have the following properties: a high thermal conductivity, low swelling (solid swelling due to fission processes and gaseous swelling due to fission gas bubble formation), similar thermal expansion, good high temperature corrosion behaviour in steam and with cladding materials, high ductility, and suitably low thermal neutron cross-section.

These properties of the metallic matrix makes the nuclear fuel pellet suitable as an accident tolerant fuel, ATF.

Thanks to the low overall swelling, the nuclear fuel pellet may be contained in any suitable cladding tube to form a fuel rod. The cladding tube may for instance be made of silicon carbide, or of a zirconium based alloy. No additional encapsulation of the nuclear fuel pellet than the cladding tube is needed.

Thanks to the presence of uranium, the metallic matrix may be an active fissile matrix. The advantages of an active fissile matrix include lower losses in the uranium content compared to standard sphere packed fuel, and to a non-active matrix.

According to an embodiment of the invention, the concentration of each of the principle elements in the metallic matrix is at least 5 molar-%.

According to an embodiment of the invention, the alloy is a single phase alloy, or near single phase alloy with precipitates constituting less than 5 volume-% of the alloy.

The high ductility of the metallic matrix of a single phase alloy is increased compared to single phase BCC metals. The increased ductility results in an improved Pellet-Cladding Interaction, PCI, of the nuclear fuel pellet in a cladding tube.

According to an embodiment of the invention, the alloy is a high entropy alloy, HEA, which has four principle elements, no one of which is dominating. These single phase alloys are named high entropy alloys, HEAs, because their liquid or random solid solution states have significantly higher mixing entropies than those in conventional alloys. Thus, the effect of entropy is much more pronounced in high entropy alloys.

According to an embodiment of the invention, the alloy is $U_{5-6}Zr_{3-4}NbTi$. This single phase alloy forms a possible high entropy alloy for the matrix of the nuclear fuel pellet.

$U_{5-6}Zr_{3-4}NbTi$ has a uranium density of approximately 9.7 $g/cm^3$, which is similar to the uranium density of $UO_2$.

According to an embodiment of the invention, the alloy has a body centred cubic structure, BCC.

According to an embodiment of the invention, the total concentration of the possible rest elements in the metallic matrix is at the most 5 molar-%, preferably at the most 4 molar-%, more preferably at the most 3 molar-%, most preferably at the most 2 molar-%.

According to an embodiment of the invention, the ceramic fuel particles are uniformly dispersed in the matrix.

According to an embodiment of the invention, the ceramic fuel particles comprise at least one fissile material selected from the group of actinide oxide, actinide nitride, actinide silicide and actinide carbide.

According to an embodiment of the invention, the ceramic fuel particles comprise at least one fissile materials selected from the group of $UO_2$, $U_3Si_2$, $U_3Si$, USi, UN, $PuO_2$, $Pu_3Si_2$, $Pu_3Si$, PuSi, PuN, $ThO_2$, $Th_3Si_2$, $Th_3Si$, ThSi and ThN.

All of these fissile materials are suitable for being dispersed in the single phase alloy of the nuclear fuel pellet. The single phase alloy of the nuclear fuel pellet will protect the ceramic particles from any detrimental mechanical or chemical effect during operation of the nuclear reactor. Thus no further encapsulation of the ceramic particles would be needed.

According to an embodiment of the invention, the ceramic fuel particles comprise at least one of UN, PuN, ThN, wherein the nitrogen of ceramic fuel particles is enriched to contain a higher percentage of the isotope $^{15}N$ than natural N.

The object is also achieved by the fuel rod initially defined, which comprises a cladding tube enclosing a plurality of nuclear fuel pellets as defined above.

The object is also achieved by the fuel assembly defined above for use in a nuclear reactor, which comprises a plurality of said fuel rods.

BRIEF DESCRIPTION OF THE DRAWINGS

The invention is now to be explained more closed through a description of various embodiments and with reference to the drawings attached hereto.

FIG. 1 discloses schematically a longitudinal sectional view of a fuel assembly for a nuclear reactor.

FIG. 2 discloses schematically a longitudinal sectional view of a fuel rod of the fuel assembly in FIG. 1.

FIG. 3 discloses longitudinal sectional view of a nuclear fuel pellet according to a first embodiment.

DETAILED DESCRIPTION

FIG. 1 discloses a fuel assembly 1 for use in nuclear reactor, in particular in a water cooled light water reactors, LWR, such as a Boiling Water Reactor, BWR, or a Pressurized Water reactor, PWR. The fuel assembly 1 comprises a bottom member 2, a top member 3 and a plurality of elongated fuel rods 4 extending between the bottom member 2 and the top member 3. The fuel rods 4 are maintained in their positions by means of a plurality of spacers 5. Furthermore, the fuel assembly 1 may, for instance when to be used in a BWR, comprise a flow channel or fuel box indicated by dashed lines 6 and surrounding the fuel rods 4.

FIG. 2 discloses one of the fuel rods 4 of the fuel assembly 1 of FIG. 1. The fuel rod 4 comprises a nuclear fuel in the form of a plurality of nuclear fuel pellets 10, and a cladding tube 11 enclosing the nuclear fuel pellets 10. The fuel rod 4 comprises a bottom plug 12 sealing a lower end of the cladding tube 11, and a top plug 13 sealing an upper end of the fuel rod 4. The nuclear fuel pellets 10 are arranged in a pile in the cladding tube 11. The cladding tube 11 thus encloses the fuel pellets 10 and a gas. A spring 14 is arranged in an upper plenum 15 between the pile of nuclear fuel pellets 10 and the top plug 13. The spring 14 presses the pile of nuclear fuel pellets 10 against the bottom plug 12.

An embodiment of one of the nuclear fuel pellets 10 is disclosed in FIG. 3. The nuclear fuel pellet 10 comprises, or consists of a metallic matrix 20 and ceramic fuel particles 21 of a fissile material dispersed in the matrix 20. The ceramic fuel particles 21 may be uniformly and randomly dispersed in the matrix 20.

The number of ceramic fuel particles 21 in each nuclear fuel pellet 10 may be very high. The volume ratio particles/matrix may be less than 0.01:1 or 0.01:1 up to 1:0.01.

The ceramic fuel particles 21 may have a spherical shape, or substantially spherical shape, or may be a form of any shape.

The size of the ceramic fuel particles 21 may vary. For instance, the ceramic fuel particles 21 may have an extension, such as the diameter in the spherical example, which lies in the range from 100 to 2000 micrometers.

The ceramic fuel particles 21 comprise or consist of at least one fissile material. The fissile material is selected from the group of actinide oxide, actinide nitride, actinide silicide and actinide carbide. In particular, the fissile material selected from the group of $UO_2$, $U_3Si_2$, $U_3Si$, USi, UN, $PuO_2$, $Pu_3Si_2$, $Pu_3Si$, PuSi, PuN, $ThO_2$, $Th_3Si_2$, $Th_3Si$, ThSi and ThN. The ceramic fuel particles 21 may thus comprise or consist of one or more of these materials.

The metallic matrix 20 is an alloy consisting of the principle elements U, Zr, Nb and Ti, and possible residual elements. The alloy of the metallic matrix 20 may have a body centered cubic, BCC, structure.

The alloy is may be a single phase alloy, or a near single phase alloy with precipitates constituting less than 5 volume-% of the alloy.

The concentration of each of the principle elements in the metallic matrix 20 is at the most 50 molar-%, and at least 5 molar-%.

The total concentration of the possible rest elements in the metallic matrix 20 is at the most 5 molar-%, preferably at the most 4 molar-%, more preferably at the most 3 molar-%, most preferably at the most 2 molar-%.

The single phase alloy, or near single phase alloy, of the metallic matrix 20 is a so called High Entropy Alloy, HEA.

More specifically, the single phase alloy, or near single alloy, of the metallic matrix 20 may be $U_{5-6}Zr_{3-4}NbTi$.

The nuclear fuel pellet 10 may also comprise other particles than ceramic fuel particles 21, in particular absorbing particles comprising a neutron absorbing substance. Such a substance with a high neutron absorption cross-section may comprise boron, gadolinium, etc.

The nuclear fuel pellet 10 may be a sintered nuclear fuel pellet 10. A powder of the principle elements and the rest elements are mixed with the ceramic fuel particles 21, and possible absorbing particles, to form a mixture. The ceramic fuel particles 21 may have been sintered in advance. The mixture is compressed to a green body, which is then sintered in a suitable oven/furnace or any other suitable method, such as spark-plasma sintering (SPS), to the nuclear fuel pellet 10.

The nuclear fuel pellet 10 may also as an alternative be manufactured in other ways, for instance through casting or extrusion.

The present invention is not limited to the embodiments disclosed and described herein, but may be varied and modified within the scope of the following claims.

The invention claimed is:

1. A nuclear fuel pellet for a nuclear reactor, comprising: a metallic matrix; and
ceramic fuel particles of a fissile material dispersed in the metallic matrix,
wherein the metallic matrix is an alloy of $U_{5-6}Zr_{3-4}NbTi$ wherein a concentration of each element in the metallic matrix is at most 50 molar-%.

2. The nuclear fuel pellet according to claim 1, wherein the concentration of each of the elements in the metallic matrix is at least 5 molar-%.

3. The nuclear fuel pellet according to claim 1, wherein the alloy is a single phase alloy with precipitates constituting less than 5 volume-% of the alloy.

4. The nuclear fuel pellet according to claim 1, wherein the alloy is a High Entrophy Alloy; (HEA).

5. The nuclear fuel pellet according to claim 1, wherein the alloy has a body centered cubic structure.

6. The nuclear fuel pellet according to claim 1, wherein a total concentration of additional elements in the metallic matrix is at most 5 molar-%.

7. The nuclear fuel pellet according to claim 1, wherein the ceramic fuel particles are uniformly dispersed in the metallic matrix.

8. The nuclear fuel pellet according to claim 1, wherein the fissile material is selected from the group consisting of actinide oxide, actinide nitride, actinide silicide and actinide carbide.

9. The nuclear fuel pellet according to claim 1, wherein the fissile material is selected from the group consisting of $UO_2$, $U_3Si_2$, $U_3Si$, USi, UN, $PuO_2$, $Pu_3Si_2$, $Pu_3Si$, PuSi, PuN, $ThO_2$, $Th_3Si_2$, $Th_3Si$, ThSi and ThN.

10. A fuel rod comprising a cladding tube enclosing a plurality of nuclear fuel pellets according to claim 1.

11. A fuel assembly for use in a nuclear reactor, comprising a plurality of fuel rods according to claim 10.

* * * * *